March 26, 1957 P. SCHIEFERSTEIN 2,786,235
DIE MOLD
Filed Sept. 20, 1954
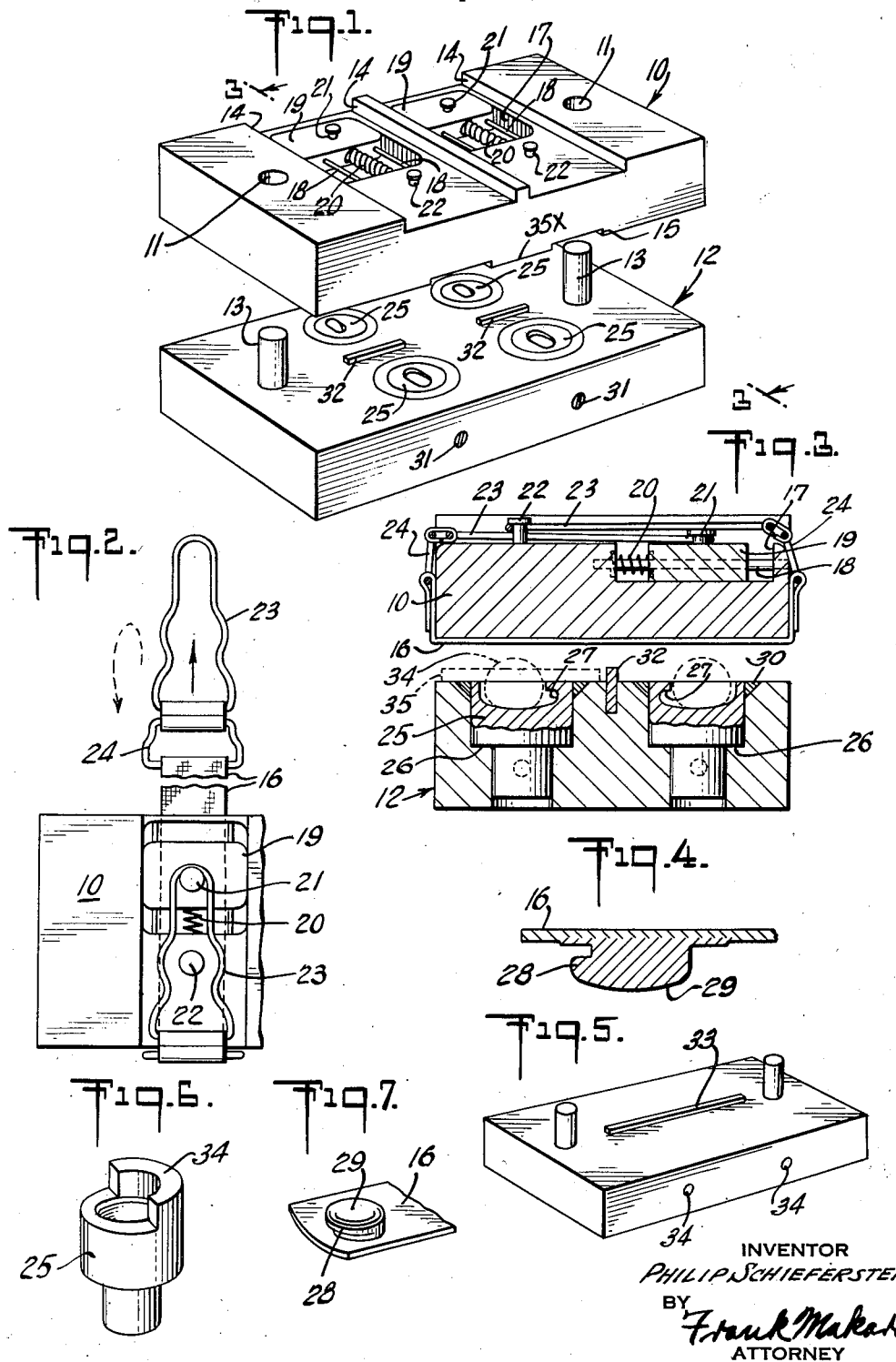
INVENTOR
PHILIP SCHIEFERSTEIN
BY
Frank Makata
ATTORNEY

United States Patent Office 2,786,235
Patented Mar. 26, 1957

2,786,235

DIE MOLD

Philip Schieferstein, Hicksville, N. Y.

Application September 20, 1954, Serial No. 456,978

3 Claims. (Cl. 18—36)

This invention relates to a mold and more particularly to a die mold for forming and securing a rubber hook or button fixedly to a fabric.

It is an object of this invention to provide a mold adapted to mold a globule or pellet of moldable rubber to a stretched piece of fabric and to cut the stretched fabric piece substantially simultaneously with the molding process.

It is another object of this invention to provide a die mold adapted to mold a plurality of pairs of rubber hooks at one time by an inexpensive process.

These and other objects of this invention will become apparent upon reading the following disclosure taken in conjunction with the illustrative embodiment shown in an accompanying drawing and in which:

Fig. 1 is a perspective view showing the top and bottom half of the die mold in spaced-apart relationship, Fig. 2 is a schematic view showing the manner of securing a fabric band to the die mold, said fabric having metal apertured clasps secured to each end of the said fabric, Fig. 3 is a transverse section taken on line 3—3 of Fig. 1 and showing the spring means for securing the fabric in a stretched manner and further showing the die mold inserts with their cavities for receiving the rubber which is to be molded and secured sustantially simultaneously to the stretched fabric during the molding process, Fig. 4 is a cross-section of a rubber hook molded to a fabric, Fig. 5 is a view of the mold bottom or base, without the die mold for purposes of simplicity, and showing a continuous cutter bar and means for securing said bar in place, Fig. 6 is a view of a modified individual rubber receiving die mold insert having an arcuate cutter bar integral thereto, and Fig. 7 is a partial view of the molded product showing the rubber hook molded adjacent the cut elastic fabric terminus.

Referring now to the drawing and particularly Figs. 1 to 3, a top mold rectangular half piece 10 is provided with a pair of spaced-apart apertures 11. A bottom mold half piece 12 is provided with a pair of fixed pillars 13 adapted to be inserted into the apertures 11, thereby securing the mold firmly together.

The top half of the mold 10 is provided with one or more, preferably several, grooves in its top surface formed by vertical walls 14. The bottom surface of the top mold half 10 is provided with channels formed by vertical walls 15. The bottom channels formed by vertical walls 15 are preferably of a depth substatially that of the fabric 16 which these channels receive.

The top half of the mold 10 is provided with a cut-out cavity in each of its top grooves, said cavity being substantially rectangular and formed by vertical walls 17. A pair of opposed walls of the cavity formed by vertical walls 17 are provided with apertures adapted to receive a pair of slide rods 18, said slide rod being disposed parallel to vertical walls 14.

A slide block 19 is provided with a pair of spaced-apart tubular apertures to slidingly receive said rods 18. In assembling the top mold half 10, the blocks 19 are placed in the cavity formed by walls 17 and the pair of slide rods 18 are then inserted through the appropriate cavity walls 17 and the tubular apertures of slide block 19 to captively and slidingly hold said block 19 in the cavity formed by said walls 17.

A compression spring 20 is disposed between the block 19 and the inner substantially centrally disposed section of wall 17, to normally urge said block 19 outwardly and away from the longitudinal center line of block half 10.

A moveable hitching post 21 is secured substantially centrally and in the top surface of block 19 and a fixed hitching post 22 is secured to block half 10 within the groove formed by walls 14 and in linear relationship to hitching post 21 and spring 20.

As shown in Fig. 2, a narrow fabric strip 16 is secured on each end to a metal clasp 23, preferably through an intermediate apertured wire means 24. As shown in Figs. 2 and 3 one of the clasps 23 engages hitching post 21 on slide block 19 and pulled so as to compress spring 20 and then the fabric 16 is tightly disposed in its appropriate groove formed by walls 15 whereupon the other clasp 23 is disposed over the first clasp 23 and secured to hitching post 22.

In this manner the fabric 16 is disposed in a stretched and tight manner in its groove.

The bottom half 12 of the die mold of this invention is provided with at least one pair of spaced apart die mold inserts 25 adapted to be fixed in said mold half and to be disposed suitably below the groove formed by walls 15 of the top mold half 10.

As shown in Fig. 3 the mold inserts 25 are substantially cylindrical and are provided with a set-back ledge 26 to seat upon a shoulder provided in block 12. The die mold inserts are provided with a cavity having an undercut lip 27 to form the hook 28 of the molded button 29 which button is molded and secured fusedly to the fabric piece 16 since the heated molding or rubber composition flows into the fabric.

The mold insert 25 is further rigidly secured with its well by means of solder 30 which latter presents a flush or smooth surface adjacent the mold top surface. The mold inserts are each secured in place by means of conventional set screws 31 disposed in the respective longitudinal side walls of the bottom block 12.

A cutter bar 32 of a length equal substantially to the width of the groove formed by walls 15 is disposed between each pair of die inserts 25 at an intermediate point thereof.

In place of separate cutter bars 32 for each groove formed by walls 15 a single bar 33 (Fig. 5) may be provided and removeably secured to the bottom block 12 by means of set-screws 34. Where a single or continuous cutter bar 33 is provided, the dividing ridge 35X (Fig. 1) located between the respective grooves formed by walls 15 is cut suitably to receive bar 33.

In modification of this invention, each of the die mold inserts 25 may be provided with an integral cutter bar lip 34 (Fig. 6), in which case the individual cutter bars 32 are dispensed with.

It will be seen that each groove formed by vertical walls 15 co-acting with a cutter bar 32 results in the heat molding of a pair of globules 34 or strips 35 (both shown in dotted outline Fig. 3) of moldable rubber to a stretched fabric piece 16 to form a pair of hooked buttons 29 fusedly secured to the fabric with substantial simultaneous cutting of the molded product to form a pair of the desired tabs adapted for being secured to girdles and like products. It will be noted that the cutter bar 32 and the modifications thereof, cut by pressing against the stretched fabric 16 and do not co-act with a cutting groove provided to effect a cutting action.

This invention was described by means of an illustrative embodiment but it is not to be confined to this illustration but only to the claims herein.

I claim:

1. A die mold for molding at least one pair of spaced-apart rubber hooks to stretched elastic fabric with substantial simultaneous cutting of the fabric intermediate the molded hooks comprising a top block half section, a bottom block half section, said top block section having at least one top groove in the top wall and a co-acting bottom groove disposed therebeneath, said top groove having a cavity disposed therein, a guide block slidingly disposed in said cavity and having a pair of spaced-apart tubular apertures therein, a pair of slide rods disposed fixedly in said cavity and through said tubular apertures of said guide block, a compression spring disposed between said guide block and a cavity wall, a hitching post secured to said slidable guide block, a second hitching post secured fixedly in said top groove, said bottom block having a pair of spaced-apart die mold inserts secured therein and adapted to engage said stretched fabric, a cutter bar disposed intermediate said die inserts and means for aligning slidably said top block half section to said bottom block half section.

2. The apparatus of claim 1 having a continuous cutter bar removeably disposed in said bottom block half section and adapted to cut a plurality of stretched fabric pieces.

3. The apparatus of claim 1 wherein each of said die mold inserts are provided with curvatured cutting bar lip in lieu of a cutting bar disposed intermediate a pair of opposed die mold inserts.

References Cited in the file of this patent

UNITED STATES PATENTS

| | | |
|---|---|---|
| 456,303 | Egge | July 21, 1891 |
| 2,006,535 | Broadwell | July 2, 1935 |
| 2,335,222 | Storch | Nov. 23, 1943 |
| 2,500,598 | Axelrod | Mar. 14, 1950 |
| 2,515,830 | Mahler | July 18, 1950 |
| 2,589,442 | Siegrist | Mar. 18, 1952 |
| 2,661,498 | Blaurock | Dec. 8, 1953 |